Jan. 16, 1962 — W. E. HOWALD — 3,016,700
THRUST REVERSER FOR JET ENGINES
Filed July 7, 1958 — 4 Sheets-Sheet 1
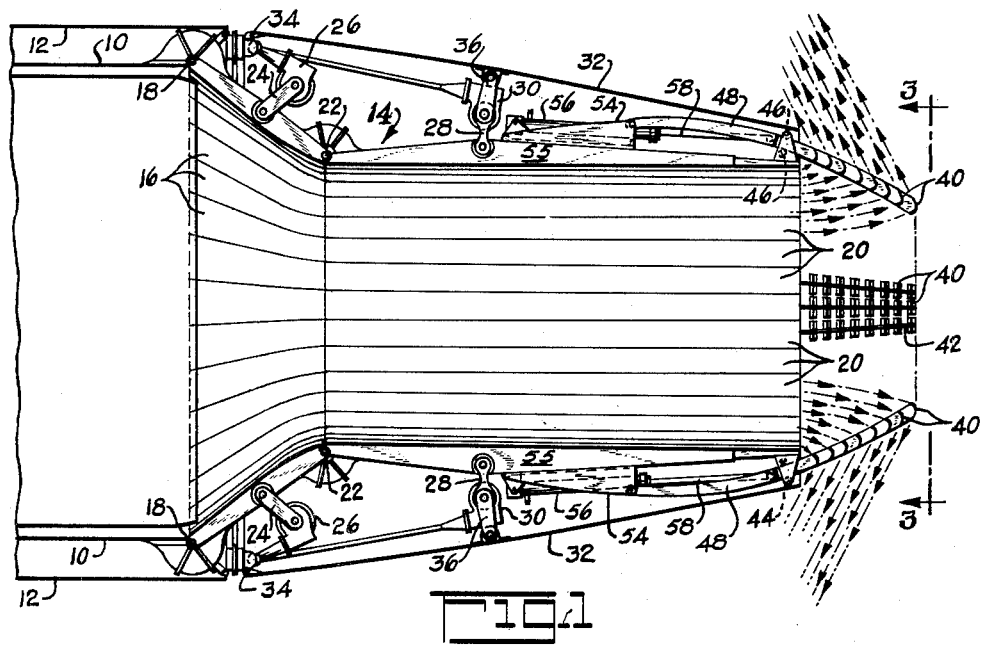
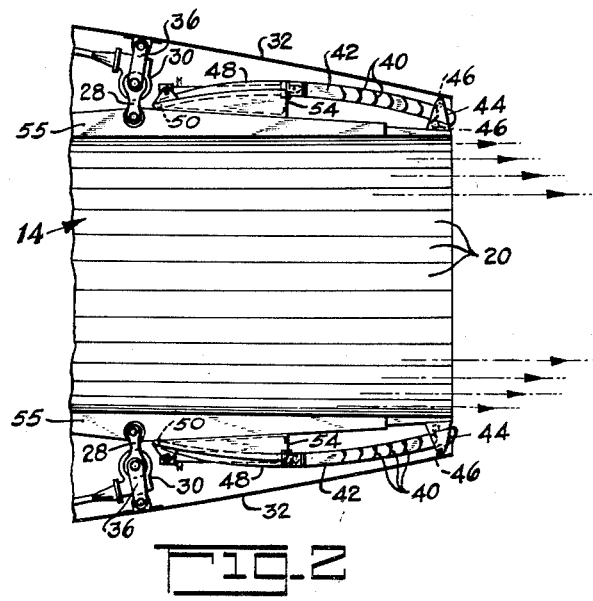
INVENTOR.
WERNER E. HOWALD
BY
ATTORNEY Jan. 16, 1962 W. E. HOWALD 3,016,700
THRUST REVERSER FOR JET ENGINES
Filed July 7, 1958 4 Sheets-Sheet 2

INVENTOR.
WERNER E. HOWALD
BY *Victor L. Behn*
ATTORNEY

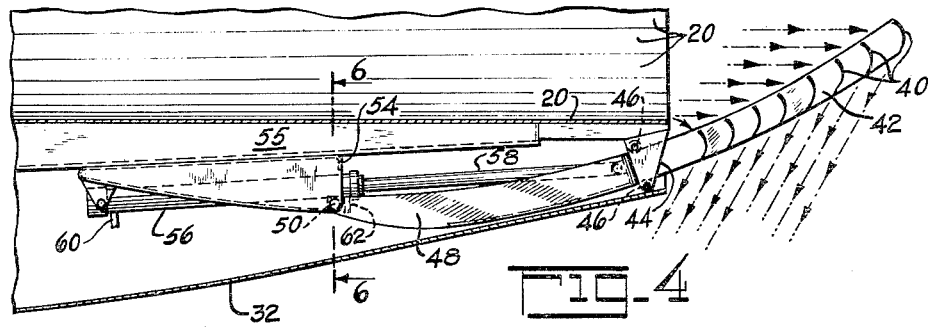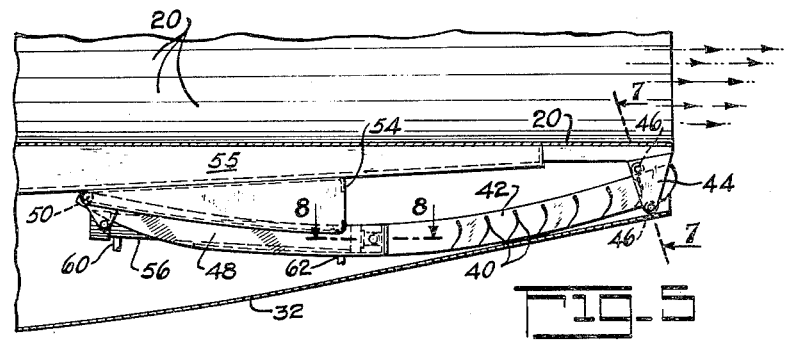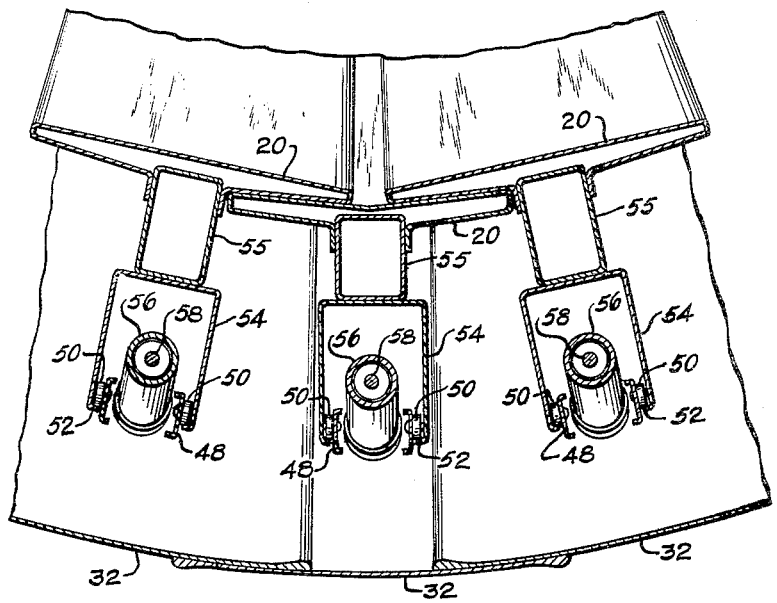

Jan. 16, 1962 W. E. HOWALD 3,016,700
THRUST REVERSER FOR JET ENGINES
Filed July 7, 1958 4 Sheets-Sheet 4
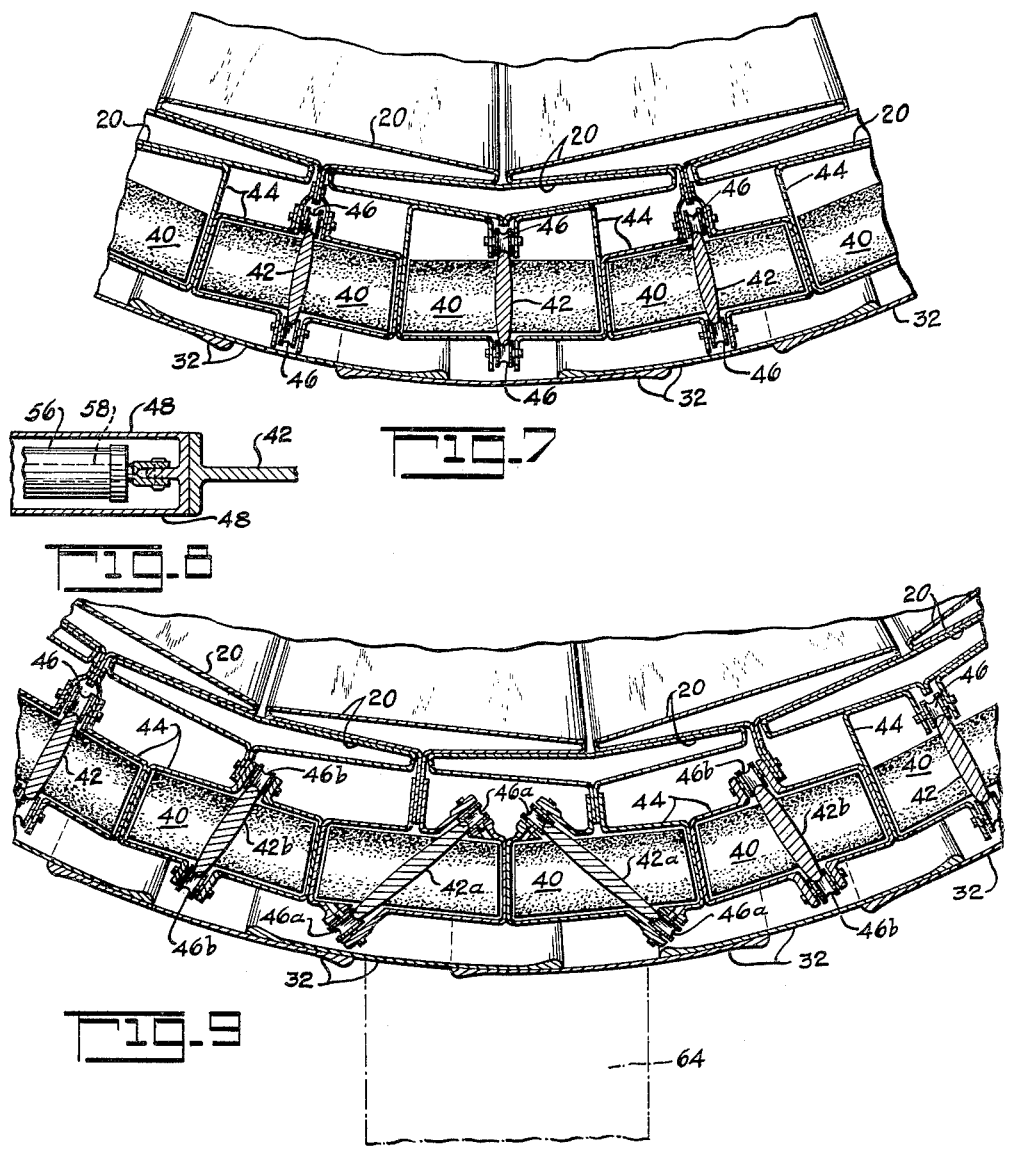
INVENTOR.
WERNER E. HOWALD
BY
ATTORNEY United States Patent Office 3,016,700
Patented Jan. 16, 1962

3,016,700
THRUST REVERSER FOR JET ENGINES
Werner E. Howald, Ridgewood, N.J., assignor to Curtiss-Wright Corporation, a corporation of Delaware
Filed July 7, 1958, Ser. No. 747,003
8 Claims. (Cl. 60—35.54)

This invention relates to the exhaust nozzles of jet engines and is particularly directed to mechanism for reversing or changing the direction of the engine exhaust gases.

Mechanism for reversing or changing the direction of the exhaust gases discharging from a jet engine is known for providing rapid braking of the forward speed of aircraft powered by such engines. An object of the invention comprises the provision of novel mechanism of this type.

A jet engine having a variable area exhaust nozzle may also have a movable shroud surrounding and connected to the nozzle so that inward and outward adjustment of the nozzle is accompanied by a corresponding adjustment of the nozzle shroud to reduce the aerodynamic drag. Such a nozzle is disclosed in copending patent application Serial No. 699,953 and comprises a circumferential assembly of adjustable nozzle members and a circumferential assembly of adjustable shroud members surrounding the nozzle. A further object of this invention comprises the provision of a mechanism for reversing or changing the direction of the exhaust gases of a jet engine having such a nozzle and in which said mechanism is disposed between the movable nozzle and shroud members and is extendible rearwardly of the nozzle from between said members for changing the direction of at least a portion of the nozzle exhaust gases.

Other objects of the invention will become apparent upon reading the annexed detailed description in connection with the drawing in which:

FIG. 1 is an axial sectional view thru a jet engine nozzle construction embodying the invention and illustrating the reverse thrust mechanism in its extended or reverse thrust position;

FIG. 2 is a partial view similar to FIG. 1 but illustrating the reverse thrust mechanism in its retracted position;

FIGS. 4 and 5 are enlarged views of portions of FIGS. 1 and 2 respectively;

FIG. 6 is a sectional view taken along lines 6—6 of FIG. 4;

Figure 3:
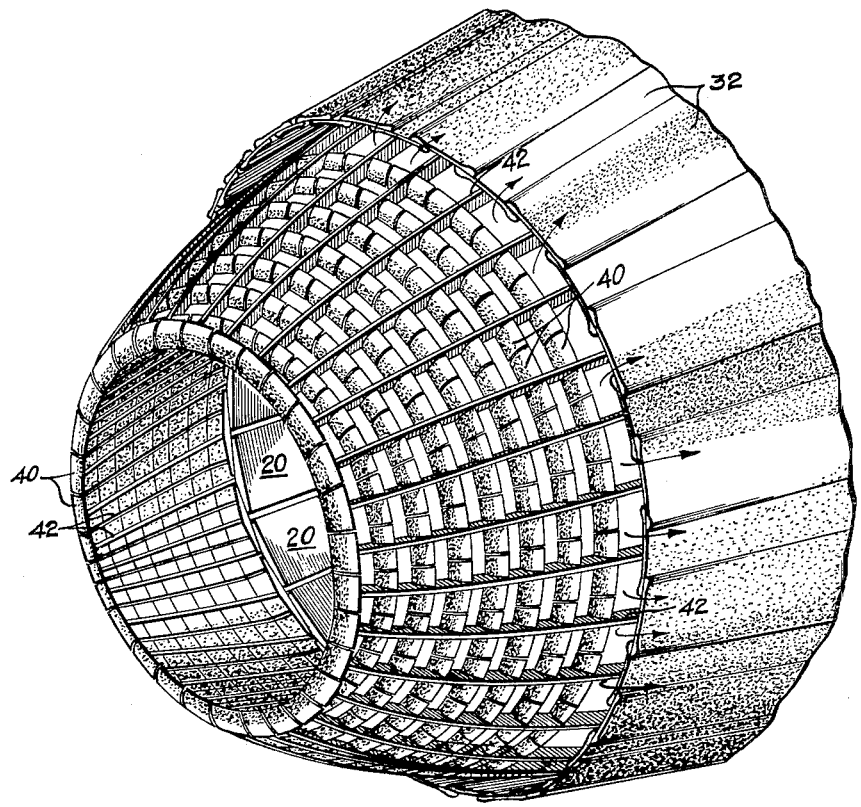
FIG. 3 is a prospective view of the discharge end of the nozzle and illustrating the reverse thrust mechanism in its extended position.

FIGS. 7 and 8 are sectional views taken along lines 7—7 and 8—8 respectively of FIG. 5; and FIG. 9 is a view similar to FIG. 7 but illustrating a modified construction.

Referring first to FIG. 1 of the drawing, reference numeral 10 designates the discharge end of the exhaust duct of an aircraft jet engine. A housing or engine nacelle 12 surrounds the duct 10, said housing forming part of the aircraft structure over which the surrounding air flows. An exhaust nozzle 14 is supported at the discharge end of the duct 10.

The nozzle 14 comprises a plurality of upstream nozzle segments 16 which are arranged in circumferential assembly and each segment 16 is hingedly supported on the duct 10 at the upstream end of said segment as indicated at 18. The nozzle 14 also has a plurality of downstream nozzle segments 20 arranged in a circumferential assembly, there being one downstream segment 20 for each upstream segment 16 with the upstream end of each downstream segment 20 being pivotally connected at 22 to the downstream end of its upstream segment 16. Thus the nozzle 14 may be considered to comprise a plurality of nozzle members 16, 20 arranged in a circumferential assembly with each nozzle member being hingedly supported at its upstream end as indicated at 18 and consisting of upstream and downstream segments 16 and 20 hingedly connected together at 22.

Each upstream nozzle segment 16 is connected by a link 24 to an annular mechanism 26 which is expandible and contractible to swing the segments 16 about their hinge connections 18 to vary the throat area of the nozzle, said nozzle throat being at the hinge connection 22. Likewise each downstream nozzle segment 20 is connected by a link 28 to an annular mechanism 30 which is expandible and contractible to swing the segments 20 about the hinge connections 22 to vary the divergence of said downstream segments independently of the throat area of the nozzle.

A plurality of members 32 are disposed about the nozzle 14 in circumferential assembly to form an annular shroud about the nozzle. The shroud members 32 are hingedly supported at 34 at their upstream ends and are connected to the downstream nozzle segments 20 by links 36 for inward and outward pivotal adjustment with said nozzle segments 20.

For a more detailed description of the nozzle and shroud structure so far described reference is made to copending application Serial No. 699,953 filed December 2, 1957.

A plurality of vanes 40 are provided, said vanes being arranged to be retracted (FIG. 2) between the nozzle segments 20 and shroud members 32 so as to be out of the flow path of the exhaust gases discharging thru the nozzle and being arranged to be extended (FIG. 1) from between said nozzle segments and shroud members into the flow path of at least a portion of the exhaust gases discharging thru said nozzle. As illustrated in FIGS. 1 and 4 the vanes 40 when extended deflect a portion of the exhaust gases laterally thereby reducing the engine propulsive thrust and preferably also at least partially reverse the direction of said exhaust gases so as to provide the engine with reverse thrust.

The deflecting vanes 40 are disposed in sets, each set being mounted on an axially extending bar 42. Preferably there is one bar 42 and set of vanes 40 for each nozzle segment 20 as is apparent from the perspective view of FIG. 3.

The details of the structure for supporting the sets of vanes 40 and for extending and retracting said vanes are best seen in the enlarged views of FIGS. 4 and 8.

The deflecting vanes 40 on each bar 42 are longitudinally spaced along the rear or downstream portion of said bar. The forward portion of said bar extends thru a box-like bracket 44 with each said bracket being secured to the outer side of a nozzle segment 20 at the downstream end of said segment. As previously stated there preferably is one set of vanes 40 for each nozzle segment 20 in which case a bracket 44 is mounted on each such nozzle segment.

Each bracket 44 includes a pair of guide rollers 46 which engage the inner and outer longitudinally-extending edges of each vane carrying bar 42. The box-like brackets 44 are dimensioned so that its associated bar 42 and set of vanes 40 may be retracted thru said bracket.

The forward portion of each bar 42, that is the portion forwardly of its bracket 44 when said bar is in its extended position (FIGS. 1 and 4), has a forked construction, as best seen in FIG. 8, whereby said bar has a pair of forwardly extending arms 48. Each arm 48 has a roller 50 at its extreme forward end which is arranged to run along a track 52 on a second box-like bracket 54 mounted on the associated nozzle segment 20. Each bracket 54 is supported on a beam 55 forming part of and extending along the outer side of a downstream nozzle segment 20. The outer side of each box-like bracket 54 is open as is best seen in FIG. 6 to provide clearance for accommodating pivotal swinging of a piston and cylinder fluid motor 56.

A piston and cylinder fluid motor 56 is provided for extending and retracting each set of deflecting vanes 40. Each motor 56 is pivotally connected at its forward end to the forward portion of its associated bracket 54. The motor 56 is disposed between the sides of its bracket 54 and between the arms 48 of the forked end of the associated vane carrying bar 42. The piston rod 58 of the piston and cylinder 56 extends rearwardly to and is pivotally attached to the base of the forked structure of the bar 42, as best seen in FIG. 8. Fluid pressure connections 60 and 62 are provided at each end of the motors 56 for extending and retracting said sets of vanes 40.

With the structure described, when a motor 56 is energized to extend its piston rod 58, the associated set of vanes 40 are moved rearwardly from their retracted position of FIGS. 2 and 5 to their extended position of FIGS. 1 and 4. In so doing the rollers 46 and 50 function to guide the associated vane carrying bar 42. The track 52 for the guide rollers 50 of each set of vanes 40 and its bar 42 is so shaped that when said vanes and bar are extended the bar 42 is inclined inwardly when viewed in a downstream direction whereby the vanes 40 on each bar 42 progressively get closer to the nozzle axis toward the downstream end of said bar. With this arrangement, each set of vanes 40 when extended are disposed in the flow path of a portion of the nozzle exhaust gases. When a motor 56 is energized to retract its piston rod 58, the associated set of vanes 40 and its bar 42 are moved forwardly by withdrawing the bar 42 and its vanes thru the box-like bracket 44. Again the rollers 46 and 50 function to guide the vane carrying bar 42 in this retracting motion.

Each vane-carrying bar 42 preferably has a somewhat flat but streamlined cross-section to facilitate exhaust gas flow thereover. Also each bar 42 preferably is arcuate so as to appear convex when viewed in a radially inward direction. This arcuate construction enables the bar to be housed closer to its associated nozzle segment 20 than would be the situation for a straight bar capable of being extended to the same extent into the nozzle exhaust gas stream.

With the structure described each movable nozzle segment 20 carries a set of exhaust gas deflecting vanes 40 together with the mechanism for supporting and extending and retracting said vanes. In addition each set of vanes 40 is extendible from a retracted position between its associated nozzle segment 20 and shroud member 32 into the path of a portion of the exhaust gases for deflecting said gases laterally and forwardly. The sets of vanes 40 are disposed in a circumferential assembly and when extended each set of vanes is disposed circumferentially adjacent to the neighboring sets.

Where the aircraft engine installation has an airfoil part or other structural aircraft part immediately forward of the engine exhaust nozzle, the exhaust gases would impinge on said part when the vanes 40 were extended to reverse the exhaust gas flow. It is obviously desirable to deflect the exhaust gases so that they do not so impinge on structural parts of the aircraft. For this purpose the two vane carrying bars 42a and their rollers 46a (FIG. 9) immediately to the rear of such aircraft part (indicated at 64 in dot and dash outline in FIG. 9) are inclined from the radial, when viewed in transverse section, so that they form a substantially V-shape with the apex of said V directed inwardly toward the exhaust nozzle axis. The rollers 46a for said bars 42a are similarly inclined. With this arrangement the V-forming bars 42a serve, when extended to their reverse thrust position to divide and separate the exhaust gas flow deflected thereover so that said flow does not impinge on the aircraft part 64 forwardly therefrom. The adjacent bars 42b and their rollers 46b when viewed in the transverse section of FIG. 9 may also be inclined to the radial to help separate and divide the reverse gas flow so that it does not strike the aircraft part 64.

Where, as in FIG. 9, certain of the bars 42a have radially inclined sides similarly inclined bars preferably should be disposed in other positions about the nozzle, for example diametrically opposite to the bars 42a, so that the net thrust whether forward or reverse remains in an axial direction.

While I have described my invention in detail in its present preferred embodiment it will be obvious to those skilled in the art after understanding my invention that various changes and modifications may be made therein without departing from the spirit or scope thereof.

I claim as my invention:

1. A jet engine exhaust nozzle construction comprising a circumferential assembly of nozzle members movable inwardly and outwardly to vary the nozzle area; a circumferential assembly of shroud members co-axially surrounding and connected to the nozzle members for simultaneous movement therewith; exhaust gas deflecting means supported by one of said assembly of members so as to be movable inwardly and outwardly with said supporting members; and means operable for retracting said deflecting means to a position between said assemblies and out of the flow path of the nozzle exhaust gases and for extending said deflecting means out from between said assemblies into the exhaust gas flow path of the nozzle for intercepting and laterally deflecting at least a portion of the nozzle exhaust gases.

2. A jet engine exhaust nozzle construction comprising a first circumferential assembly of nozzle members movable inwardly and outwardly to vary the nozzle area; a second circumferential assembly of shroud members co-axially surrounding and connected to the nozzle members for simultaneous movement therewith; a plurality of devices for deflecting the exhaust gases, there being one such device for and supported by at least some of the movable members of one said assemblies whereby each said device is movable inwardly and outwardly simultaneously with its respective supporting member; and means operable for retracting each of said devices to a position between said assemblies and out of the flow path of the nozzle exhaust gases and for extending said devices out from between said assemblies into said nozzle exhaust gas flow path for intercepting and laterally deflecting at least a portion of the nozzle exhaust gases, said devices being disposed in a circumferential assembly such that when extended each said device is disposed circumferentially adjacent to each of its neighboring devices.

3. A nozzle construction as recited in claim 2 in which each of said devices comprises an elongate member having a plurality of deflecting vanes supported thereby and spaced therealong such that when said device is extended its vanes are disposed in the flow path of a portion of the nozzle exhaust gases for intercepting and laterally deflecting said gases.

4. A nozzle construction as recited in claim 3 in which each said elongate member is curved so as to be convex when viewed in a radially inward direction.

5. A nozzle construction as recited in claim 2 in which each said device is supported from a movable nozzle member.

6. A nozzle construction as recited in claim 2 and including means for supporting each said device during said extension and retraction movement such that said movement is along an arcuate path which is convex when viewed in a radially inward direction.

7. A nozzle construction as recited in claim 2 in which each said device comprises an elongate member having a plurality of deflecting vanes supported thereby and spaced therealong and including means cooperable with said elongate member for guiding the extension and retraction of each said device so that when said device is extended its deflecting vanes, when viewed in a downstream direction are progressively disposed closer to the nozzle axis.

8. A nozzle construction as recited in claim 2 in which each of said devices comprises an elongate member having a plurality of deflecting vanes supported thereby and spaced therealong such that when said device is extended its vanes are disposed in the flow path of a portion of the nozzle exhaust gases for laterally deflecting said gases, at least one adjacent pair of said elongate members being inclined to the radial direction, when viewed in transverse section, so that they form a substantially V-shape with the apex of the V directed inwardly whereby said pair of elongate members circumferentially divide the exhaust gases flowing thereover.

References Cited in the file of this patent

UNITED STATES PATENTS

| | | |
|---|---|---|
| 2,510,506 | Lindhagen et al. | June 6, 1950 |
| 2,735,264 | Jewett | Feb. 21, 1956 |
| 2,780,056 | Colley | Feb. 5, 1957 |
| 2,797,547 | Muelien et al. | July 2, 1957 |
| 2,797,548 | Marchal et al. | July 2, 1957 |
| 2,831,319 | Geary | Apr. 22, 1958 |
| 2,841,954 | Rainbow | July 8, 1958 |
| 2,846,844 | O'Rourke | Aug. 12, 1958 |
| 2,870,602 | Glenn | Jan. 27, 1959 |

FOREIGN PATENTS

| | | |
|---|---|---|
| 1,025,715 | France | Jan. 28, 1953 |
| 1,147,262 | France | June 3, 1957 |
| 739,500 | Great Britain | Nov. 2, 1955 |
| 754,065 | Great Britain | Aug. 1, 1956 |